United States Patent [19]

Mills et al.

[11] 4,121,779

[45] Oct. 24, 1978

[54] MECHANICAL SEPARATOR FOR PLANT MATERIAL

[76] Inventors: Peter B. Mills, 2495 Northlake Ct.; R. Stephen Morgan, 2399 Northlake Ct., both of Atlanta, Ga. 30345

[21] Appl. No.: 830,383

[22] Filed: Sep. 2, 1977

[51] Int. Cl.² ............................................ A47J 42/30
[52] U.S. Cl. ............................... 241/79.2; 130/30 R; 209/235; 209/358; 209/383; 209/417; 241/169.1; 366/279
[58] Field of Search ............... 241/69, 79, 79.2, 168, 241/169, 169.1, 169.2; 209/233, 235, 236, 352, 357, 358, 383, 417; 130/28, 30 R, 30 K; 366/279

[56] References Cited

U.S. PATENT DOCUMENTS

| 810,652 | 1/1906 | Hoyt et al. | 209/236 |
| 1,067,366 | 7/1913 | Newcomer | 209/358 X |
| 1,118,927 | 12/1914 | Foster | 209/357 |
| 1,251,160 | 12/1917 | Woody | 241/168 |

Primary Examiner—Howard N. Goldberg
Attorney, Agent, or Firm—Beveridge, DeGrandi, Kline & Lunsford

[57] ABSTRACT

A mechanical separator having a container providing a chamber for receiving plant material, such as herb plants, spice plants and the like, a motor driven substantially flexible member being rotatably supported for substantially free form random thrashing movement within and about the chamber in juxtarelationship for engaging, fragmenting and separating the intrinsic parts of the plant material as desired for flavoring from the waste portions thereof, a screen being provided across a dischargeway opening from the chamber of the container, such screen being of a mesh size to act to permit the fragmented and separated intrinsic parts of the plant material to be discharged therethrough and to act to retain waste portions of the plant material within the chamber.

13 Claims, 2 Drawing Figures

MECHANICAL SEPARATOR FOR PLANT MATERIAL

BRIEF BACKGROUND, FIELD AND OBJECTIVES OF THE INVENTION

This invention relates to improvements in mechanical separators for treating plant materials such as herb plants, spice plants and the like in separation of the intrinsic parts thereof as desired for flavoring from the waste portions thereof.

During the past few years, a surge of interest in home gardening has resulted in many families growing various forms of common herbs and spices. Since many varieties of such herbs and spices can be used in either a fresh or dried state, and since some of such varieties are annuals, various methods of drying and preserving such herbs and spices have been developed, so that the home gardener may use and enjoy the fruits of his labor during the winter months. An integral part of the preservation and storage of such herbs and spices involves the removal and separation of the intrinsic parts thereof as desired for flavoring from the waste portions thereof.

We are aware that various types of large, motor-driven mechanical separators have been provided for separation of the intrinsic parts of herb plants and spice plants from the waste portions thereof on a commercial scale. We are not aware of the details, construction and operation of such commercial separators.

In preparing his dried herbs and spices for preservation and storage, the home gardener usually uses fairly primitive methods of separating the intrinsic parts from the waste portions thereof, such as by crushing the dried herb and spice plants with a rolling pin and then using a flour sifter to separate the intrinsic parts from the waste portions thereof. This method of separation usually results in a pulverizing of the intrinsic parts of the herb and spice plants to a finely divided powder form, which in many instances is undesirable, in that some herbs and spices provide more suitable flavoring when they are in a fragmented rather than a powder form.

It is a primary object of our invention to provide a mechanical separator which may be used with facility by home gardeners in fragmenting and separating the intrinsic parts of plant materials, such as herb plants, spice plants and the like. It is a further object of our invention to perform such separation in a manner whereby the intrinsic parts of such plant material remain in suitably sized fragments as desired.

Other objects and advantages of the invention will become apparent from the following detailed description, taken in connection with the accompanying drawing, and in which drawing:

DETAILED DESCRIPTION

Figure 1:
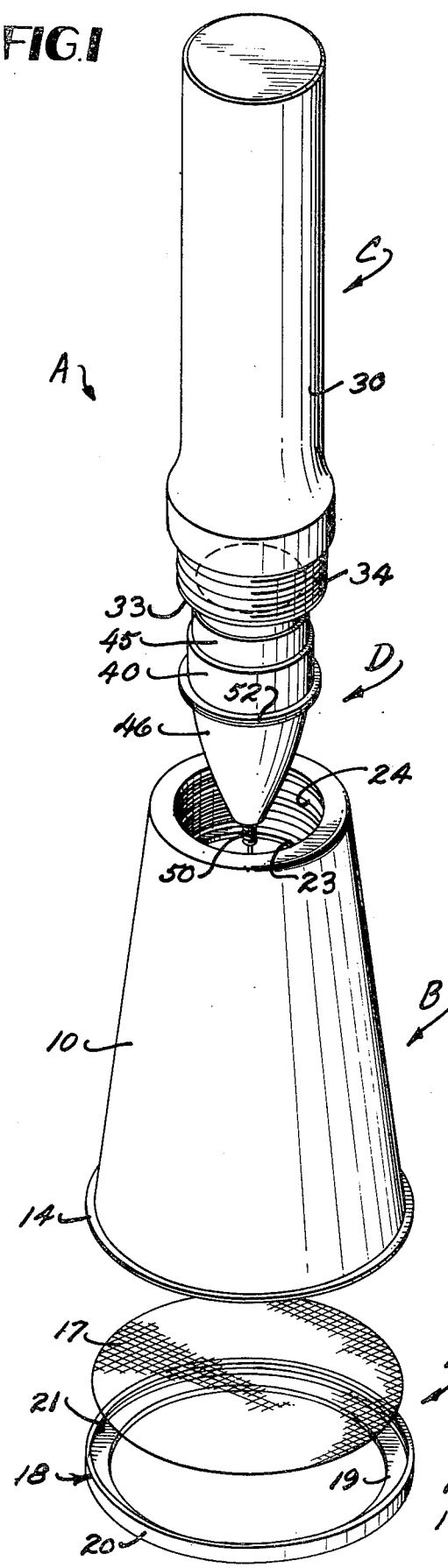
FIG. 1 is an exploded perspective view of our improved mechanical separator.

In the drawing, wherein similar reference characters designate corresponding parts throughout the several views, and wherein is shown a preferred embodiment of the invention, the letter A may generally designate our improved mechanical separator having container means B for receiving plant materials, and to which may be removably attached handle means C, and within which may be mounted drive means D for rotation of substantially flexible member E within container means B.

Container means B may be of a frustoconical shape, having side wall means 10 defining a chamber 12 therewithin; and to the vertex of which may be attached handle means C, the base thereof being open and providing a dischargeway 13 opening from chamber 12 thereof. A peripheral flange 14 may be provided about the base of frustoconical container means B, for a purpose as will be subsequently described.

Perforate means 16, which may comprise screen means 17, is preferably mounted on container means B and extends across the dischargeway thereof. Screen means 17 and wall means 10 thus provide a chamber enclosure for receiving plant material therewithin.

Screen means 17 is preferably of a mesh size to act to permit fragmented and separated intrinsic parts of plant material to be discharged therethrough from chamber 12 and to act to retain the waste portions of plant material within chamber 12.

Screen means 17 may be supported in juxtaposition to and across the base of frustoconical container means B by means of a clip ring 18 of substantially L-shaped cross section, the base leg 19 of which supports screen means 17 in abutment with the base edge of wall means 10 and the upstanding leg 20 of which is provided with a snap flange 21 which detachably engages peripheral flange 14 of container means B whereby to removably attach the same to container means B.

Screen means 17 is preferably removably attached to frustoconical container means B in order to permit facile loading of plant material to within chamber 12 thereof and so that waste materials may be readily cleaned therefrom. However, it is obviously within the scope of the present invention to provide a container means B of one piece construction, the walls thereof defining an enclosed chamber for receiving plant material, either all or only selected portions of the walls thereof being perforate and of a given mesh size, the vertex thereof being open to permit loading of plant material therethrough and within the chamber enclosure thereof, and through which waste material may be cleaned from the chamber enclosure thereof.

It is also obvious that container means B may be of a shape and configuration other than frustoconical.

The vertex of frustoconical container means B is preferably shaped to provide a sleeve means 22 which depends into the upper portion of chamber 12, having an in-turned flange 23 extending about the inner diameter of the lowermost portion thereof, for a purpose as will be subsequently described. The inner diameter of sleeve means 22 is preferably provided with threads 24 and comprises a threaded female socket for removable attachment of handle means C to container means B, as will be subsequently described.

As shown, handle means C may be substantially similar to a conventional flashlight, comprising cylindrical casing 30 which may receive dry cell batteries 32 therewithin and having an open end 33 provided peripherally thereabout with threads 34 and onto which threaded female socket of sleeve means 22 may be secured in attachment of handle means C to container means B. Cylindrical casing 30 may be provided with a conventional flashlight switch 35, including a movable contact bar 36 which is movable into and out of operable engagement with drive means D, as will be subsequently described. The usual flashlight spring means 38 may be provided within casing 30, the same being engageable with the negative base of the endmost battery 32 in completing an electrical circuit through batteries 32 and contact bar 36, and to urge the positive node of the other endmost battery 32 into operable contact with drive means D, as will be subsequently described.

Figure 2:
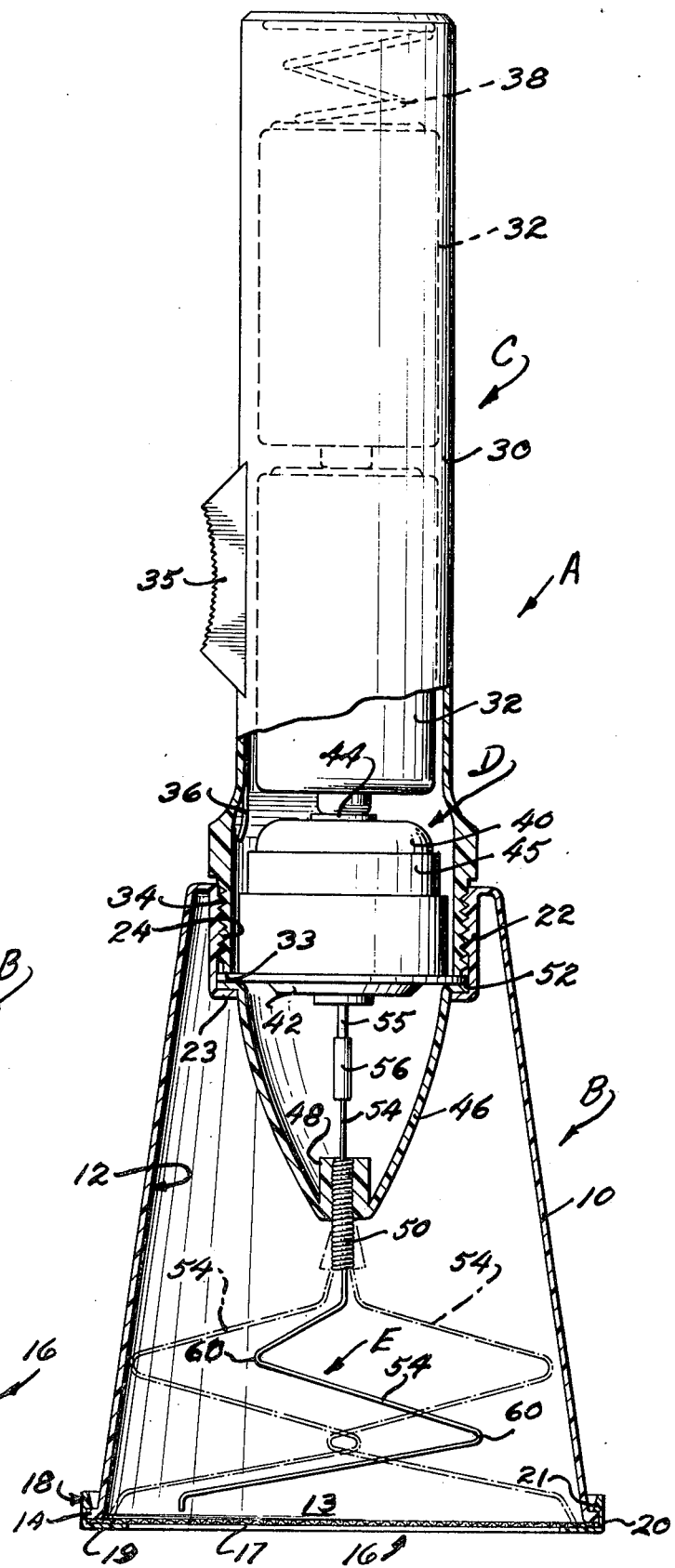
FIG. 2 is a side plan view, partly in vertical section, of our improved mechanical separator.

Drive means D preferably includes a motor housing 40 having an electric motor 42 mounted therewithin. Electric motor 42 has an endmost contact plate 44 positioned outwardly of motor housing 40 for engagement with the positive node of endmost battery 32, as shown in FIG. 2, and is operably interconnected to a contact ring 45 which is mounted on the periphery of motor housing 40 in juxtaposition for operable engagement therewith of contact bar 36 of switch 35 of handle means C.

Drive means D may also include a depending cone-shaped member 46 which inhibits plant material particles from being ingested by motor 42 and is provided with an inwardly extending sleeve 48 at the vertex end thereof. Cylindrical spring means 50 may be mounted within sleeve means 48, depending outwardly therefrom, for a purpose as will be subsequently described.

Cone-shaped member 46 is preferably integral with motor housing 40, so as to facilitate bodily removal and separation of drive means D from association with container means B and handle means C.

Drive means D is preferably provided with a flange 52 extending peripherally thereabout. In positioning of drive means D within container means B, the same is inserted within sleeve means 22, with cone-shaped member 46 thereof extending into chamber 12 of container means B, and with peripheral flange 52 abutting in-turned flange 23 of sleeve means 22, as shown in FIG. 2.

On interconnection of handle means C to container means B, motor housing 40 is received within open end 33 of casing 30 in juxtaposition for operable engagement of contact plate 44 of motor 42 with the positive node of endmost battery 32 therewithin and for operable engagement of contact 36 of switch means 35 with contact ring 45 of motor housing 40, end 33 of casing 30 abutting against the opposite side of peripheral flange 52 from in-turned flange 23 of sleeve means 22 in interconnection together of container means B, handle means C, and drive means D as a unitary hand tool.

Substantially flexible member E preferably comprises a wire or cable 54. One end thereof is preferably attached to drive shaft 55 of motor 42 such as by a coupling 56, extending therefrom through cone-shaped member 46 and outwardly therefrom and through cylindrical spring means 50, depending and having an untethered and unconnected terminus within chamber 12 of container means B, that portion of substantially flexible member E which extends within chamber 12 of container means C being preferably provided with a plurality of crimps 60, forming the same into a zig-zag shape, the lowermost end of which is, in the at rest position thereof, spaced apart from screen means 17.

On rotation of substantially flexible member E by drive means D, the shape of that portion thereof within chamber 12 of container means B will be deformed by the centrifugal force of rotation thereof and the movement thereof will thus be free form and random within and about chamber 12 to engage and fragment plant materials therewithin. On such deformation of the shape of substantially flexible member E, the outermost end thereof will intermittently contact screen means 17, to facilitate discharge therethrough of intrinsic parts of plant material that have been fragmented to the selected size to pass therethrough.

Of course, a different form of random thrashing movement of substantially flexible member E within chamber 12 may be obtained by connecting the same eccentric to drive shaft 55 of motor 42.

As previously noted, substantially flexible member D may comprise a substantially flexible cable or wire. However, such wire or cable preferably has at least a modicum of stiffness whereby it may be bent and shaped to a given configuration so that, on rotation thereof, it will sweep in a substantially random, irregular path about the plant material receiving portion of chamber 12 and at least the tip end thereof will intermittently contact screen means 17.

If substantially flexible member D is of a limply flexible material, such as an unstiffened cord or chain, the relatively constant centrifugal force of rotation, after initial start, would likely cause the same to conform to one regular rotational plane rather than to irregularly and randomly thrash about throughout the plant material receiving confines of chamber 12. Also, on rotation of such limply flexible member, the same would not likely come into intermittent and random contact with screen means 17. Further, if such otherwise limply flexible member was of a sufficient weight to arch, rather than form into a substantially flattened swing plane on rotation thereof, then the very weight thereof would likely pulverize the intrinsic parts of plant material into powder form, rather than to merely fragment the same.

At the other end of the spectrum of stiffness, substantially flexible member E is preferably not of a stiffness such that it merely acts to stir the contents of chamber 12 in the nature of an egg beater.

When it is desired to clean mechanical separator A, handle means C and drive means D with substantially flexible member E interconnected thereto may be detached and removed from container means B and container means B and substantially flexible member E washed.

Various changes may be made in the form of the invention herein shown and described without departing from the spirit of the invention and the scope of the following claims:

We claim:

1. In a mechanical separator for thrashing plant material such as herb plants, spice plants and the like to separate and sort intrinsic parts such as the dry leaves thereof from waste portions such as the seeds and stems thereof, the combination of container means for providing a chamber enclosure for receiving plant material to be treated and including perforate means for inhibiting egress of other than intrinsic parts of plant material from said chamber, a substantially flexible member extending within said chamber, and drive means operably interconnected to said substantially flexible member for rotation of said substantially flexible member within and about said chamber, said substantially flexible member depending and having an untethered and unconnected terminus within said chamber and being of a configuration and flexure to follow an irregular and random path of free form thrashing movement within and substantially throughout the plant material receiving confines of said chamber enclosure on rotation thereof by said drive means in juxtaposition for engaging, fragmenting and separating intrinsic parts of plant material in said chamber from the waste portions thereof, said perforate means being of a mesh size to act to permit such fragmented and separated intrinsic parts of plant material to be discharged therethrough from said chamber and to act to retain the waste portions of plant material within said chamber.

2. A mechanical separator as specified in claim 1 wherein said container means is of a frusto-conical shape having handle means attached to and extending from the vertex thereof and a dischargeway opening from the base thereof, and said perforate means comprises screen means extending across said dischargeway, defining a chamber enclosure having the plant material confines thereof disposed primarily adjacent said screen means.

3. A mechanical separator as specified in claim 2 wherein said substantially flexible member is crimped in a manner to provide a zig-zag plant material engaging portion extendant within said chamber enclosure.

4. A mechanical separator as specified in claim 3 wherein the terminus of said zig-zag portion within said chamber enclosure is intermittently engageable with said screen means on rotation of said substantially flexible member.

5. A mechanical separator as specified in claim 2 wherein said drive means includes an electric motor operably interconnected to said substantially flexible member for rotation thereof within and about said chamber enclosure, and said handle means comprises a casing for receiving battery means and includes switch means operably engageable with said drive means for operation of said electric motor.

6. A mechanical separator as specified in claim 5 including cylindrical spring means for receiving therethrough and guiding said substantially flexible member intermediate the length thereof.

7. A mechanical separator as specified in claim 5 wherein said screen means is detachably interconnected to said side wall means for removal thereof in loading said chamber with plant material.

8. A mechanical separator as specified in claim 5 wherein said substantially flexible member is crimped in a manner to provide a zig-zag plant material engaging portion extendant within said chamber enclosure.

9. A mechanical separator as specified in claim 8 wherein the terminus of said zig-zag portion within said chamber enclosure is intermittently engageable with said screen means on rotation of said substantially flexible member.

10. A mechanical separator as specified in claim 1 wherein said substantially flexible member is crimped in a manner to provide a zig-zag plant material engaging portion extendant within said chamber enclosure.

11. A mechanical separator as specified in claim 10 wherein the terminus of said zig-zag portion within said chamber enclosure is intermittently engageable with said screen means on rotation of said substantially flexible member.

12. A mechanical separator as specified in claim 1 wherein said substantially flexible member is of wire.

13. In a mechanical separator for thrashing plant material such as herb plants, spice plants and the like to separate and sort intrinsic parts such as the dry leaves thereof from waste portions such as the seeds and stems thereof the combination of container means for providing a chamber enclosure for receiving plant material to be treated and including perforate means for inhibiting egress of other than intrinsic parts of plant material from said chamber, a substantially flexible member extending within said chamber, and drive means operably interconnected to said substantially flexible member for rotation of said substantially flexible member within and about said chamber, said substantially flexible member depending and having an untethered and unconnected terminus within said chamber for substantially free form random thrashing movement within and about said chamber on rotation thereof by said drive means in juxtaposition for engaging, fragmenting and separating intrinsic parts of plant material in said chamber from the waste portions thereof, said perforate means being of a mesh size to act to permit such fragmented and separated intrinsic parts of plant material to be discharged therethrough from said chamber and to act to retain the waste portions of plant material within said chamber, the terminus of said substantially flexible member within said chamber being intermittently engageable with said perforate means on rotation of said substantially flexible member.

* * * * *